No. 696,608. Patented Apr. 1, 1902.
W. H. TAYLOR.
LOCK HUB.
(Application filed Apr. 4, 1898.)
(No Model.)
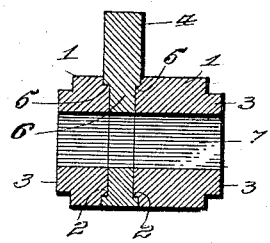
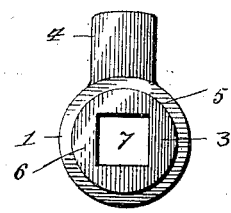
Witnesses
Herbert Bradley
Edward K. Allen
Inventor
Warren H. Taylor
By Knight Bros.
Attorneys

United States Patent Office.

WARREN H. TAYLOR, OF STAMFORD, CONNECTICUT, ASSIGNOR TO THE YALE & TOWNE MANUFACTURING COMPANY, OF STAMFORD, CONNECTICUT.

LOCK-HUB.

SPECIFICATION forming part of Letters Patent No. 696,608, dated April 1, 1902.

Application filed April 4, 1898. Serial No. 676,426. (No model.)

*To all whom it may concern:*

Be it known that I, WARREN H. TAYLOR, a citizen of the United States, and a resident of Stamford, in the county of Fairfield and State of Connecticut, (whose post-office address is Stamford, in the county of Fairfield and State of Connecticut,) have invented certain new and useful Improvements in Lock-Hubs, of which the following is a specification.

My present invention relates to the construction of lock-hubs for the latch-operating arm.

The features of my said invention are a trunnioned hub having an angular spindle-opening and a latch-operating arm connected with the hub through the medium of a ring which seats upon a reduced neck formed on the hub. The hub is made in two sections, each of which is provided with a portion of the reduced neck, over which the ring of the latch-operating arm fits, while said ring is provided with an inwardly-projecting portion which the ends of the hub-section abut and through which is formed an angular spindle-opening which is a continuation of the angular spindle-opening in the hub-sections.

The invention will be fully understood upon reference to the accompanying drawings, in which—

Figure 1 is a longitudinal sectional view of the hub, and Fig. 1ª is an end view.

I form the hub 1 with a reduced neck 2 and with the usual trunnions 3, which engage in the bearings in the lock-casing (not shown) in a manner common to locks of this character. A latch-operating arm 4 is provided with a ring 5, which fits over the reduced neck of the hub, which is divided in the plane of the ring into sections, each of which is formed with a portion of the reduced neck.

The ring 5 holds the two sections of the hub in alinement and is provided with an inwardly-projecting portion which is gripped between the hub-sections when they are confined between the two plates of the casing, and the inwardly-projecting portion is provided with an angular opening 7 to receive the knob-spindle.

Having thus described my invention, the following is what I claim as new therein and desire to secure by Letters Patent:

1. The combination of a hub formed with both trunnions, a reduced neck, and an angular spindle-opening, and a latch-operating arm having a ring fitting around the reduced neck, so that the trunnions project beyond it; the hub being divided in the plane of the ring so that the latter is gripped between the parts of the hub when said parts are held together by the lock-casing, when the hub is in use.

2. The combination of a hub, having trunnions, and a reduced neck formed thereon, and an angular spindle-opening formed therein, the hub being divided through the reduced neck to form a neck portion on each part of the hub; and a latch-operating arm having a ring fitting around both portions of the reduced neck, and having a central portion 6 introduced between the hub parts and formed with a spindle-opening.

WARREN H. TAYLOR.

Witnesses:
SCHUYLER MERRITT,
WM. A. CUDLIPP.